United States Patent [19]

Beckmann et al.

[11] Patent Number: 5,616,678
[45] Date of Patent: *Apr. 1, 1997

[54] AZO DYESTUFF- AND URETHANE-CONTAINING POLYADDUCT AND ITS USE IN NONLINEAR OPTICS

[75] Inventors: Stefan Beckmann, Bad Dürkheim; Karl-Heinz Etzbach, Frankenthal; Rüdiger Sens, Mannheim; Karl Häberle, Speyer, all of Germany

[73] Assignee: BASF Aktiengesellschaft, Ludwigshafen, Germany

[ * ] Notice: The term of this patent shall not extend beyond the expiration date of Pat. No. 5,401,612.

[21] Appl. No.: 325,060

[22] Filed: Oct. 19, 1994

[30] Foreign Application Priority Data

Oct. 19, 1993 [DE] Germany .......................... 43 35 540.4

[51] Int. Cl.$^6$ .................................. C08G 18/30
[52] U.S. Cl. ............... 528/73; 252/582; 385/130
[58] Field of Search ............... 528/73; 252/582; 385/130

[56] References Cited

U.S. PATENT DOCUMENTS

| | | | |
|---|---|---|---|
| 4,751,254 | 6/1988 | Kluger et al. | 521/163 |
| 5,061,404 | 10/1991 | Wu et al. | 252/502 |
| 5,194,463 | 3/1993 | Krutak et al. | 524/35 |
| 5,401,612 | 3/1995 | Etzbach | 528/288 |

FOREIGN PATENT DOCUMENTS

| | | |
|---|---|---|
| 0359648 | 3/1990 | European Pat. Off. . |
| 2650283 | 2/1991 | France . |

*Primary Examiner*—Rachel Gorr
*Attorney, Agent, or Firm*—Oblon, Spivak, McClelland, Maier & Neustadt, P.C.

[57] ABSTRACT

Azo dyestuff- and urethane-containing polyadducts comprising (a) at least one organic polyisocyanate,
(b) at least one diol of a heterocyclic azo dyestuff, and if desired (c) one or more compounds having at least two groups reactive to NCO, which have an average molecular weight $\bar{M}_n$ of up to 500 g/mol, and/or
(d) one or more polyhydroxy compounds having average molecular weights $\bar{M}_n$ of from over 500 up to 5000 g/mol.

These polyadducts are suitable for applications in nonlinear optics.

12 Claims, No Drawings

AZO DYESTUFF- AND URETHANE-CONTAINING POLYADDUCT AND ITS USE IN NONLINEAR OPTICS

Azo dyestuff- and urethane-containing polyadduct and its use in nonlinear optics The invention relates to azo dyestuff- and urethane-containing polyadducts and to their use in nonlinear optics.

Polyurethanes containing nitroazo dyestuffs are disclosed in EP-A 0 359 648 and FR-A 2 650 283. The products described therein, however, are in need of improvement with respect to their NLO properties.

It is an object of the present invention to demonstrate products having improved processing properties, which have good film-forming properties and moreover particularly advantageous NLO properties.

We have now found that this object is achieved by the use of heterocyclic chromophores of high β value.

The present invention relates to azo dyestuff- and urethane-containing polyadducts comprising (a) at least one organic polyisocyanate, (b) at least one diol of a heterocyclic azo dyestuff, and if desired (c) one or more compounds having at least two groups reactive to NCO, which have an average molecular weight $\overline{M}_n$ of up to 500 g/mol, and/or (d) one or more polyhydroxy compounds having average molecular weights $\overline{M}_n$ of from over 500 up to 5000 g/mol, with the proviso that relative to one gram equivalent of NCO of the component (a), from 0.1 to 2 gram equivalents of hydroxyl groups of the components (b), from 0 to 0.9 gram equivalents of NCO-reactive groups of the component (c), and from 0 to 0.5 gram equivalent of hydroxyl groups of the component (d) are employed, the ratio of the NCO groups in component (a) to the sum of the NCO-reactive groups in the components (b), (c) and (d) being 2:1 to 1:2, and the component (b) has the general formula (I)

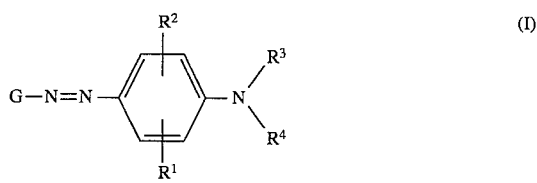

where
G is a heterocyclic ring,
$R^1$ and $R^2$ are identical to or different from one another and are hydrogen, alkyl having 1 to 6 carbon atoms, cycloalkyl having 3 to 7 carbon atoms, alkoxy having 1 to 6 carbon atoms, phenyl- or $C_1$-to $C_4$-alkoxy-substituted alkyl, CN, $NO_2$, $SO_3H$, CHO or a group capable of crosslinking,
$R^3$ and $R^4$ are identical to or different from one another and are aliphatic hydrocarbon radicals having 1 to 12 carbon atoms, cycloaliphatic hydrocarbon radicals having 5 to 15 carbon atoms, aromatic hydrocarbon radicals having 6 to 15 carbon atoms or araliphatic hydrocarbon radicals having 7 to 15 carbon atoms, or $R^3$ and $R^4$ together form a nitrogen-containing ring, with the proviso that either $R^3$ and $R^4$ in each case carry a hydroxyl group or $R^3$ carries two hydroxyl groups, but $R^4$ carries no hydroxyl group, or in the case where $R^3$ and $R^4$ together form a nitrogen-containing ring, this ring carries two hydroxyl groups bonded directly or via $C_1$–$C_6$-alkylene groups.

Preferred heterocyclic rings G in the polyadduct according to the invention are radicals of the general formula

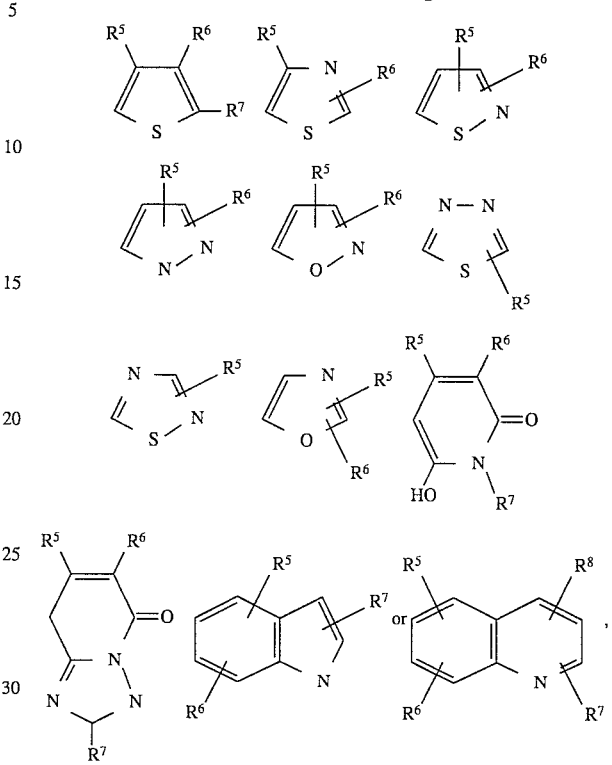

where
$R^5$ to $R^8$ are identical to or different from one another and are alkyl having 1 to 10 carbon atoms,
cycloalkyl having 3 to 8 carbon atoms,
alkoxy having 1 to 8 carbon atoms,
halogen, CN, $NO_2$, $CONH_2$, $CONR_2^9$, $COOR^9$, $(CH_2)_z$—$COOR^9$
where z=1 to 10, NH—CO—$R^9$,
$R^9$=alkyl having 1 to 10 carbon atoms, phenyl, benzyl, ethylphenyl or alkenyl having 2 to 10 carbon atoms or two of the radicals $R^5$ to $R^8$ in each case together form fused rings, or $R^5$ to $R^9$ are crosslinkable groups.

A preferred embodiment of the present invention also consists in that, in the general formula (I), $R^3$ and $R^4$ are —$CH_2$—$CH_2$—OH and the crosslinkable group is a cinnamoyl, oxirane,

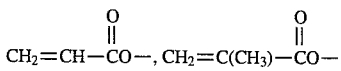

$CH_2$=CH—, $CH_2$=CH—O—CO— or $CH_2$=CH—O— radical.

The present invention also relates to the use of the polyadducts according to the invention in nonlinear optics, in particular in communications technology components.

Using the azo dyestuff- and urethane-containing polyadducts according to the invention, it is possible to achieve substantial improvements in the processing properties.

On the one hand, the polyadducts according to the invention have good nonlinear optical values, on the other hand, good layer formation with low optical losses in the conduction of light is possible.

In this connection, in particular, the suitability of the polyadducts according to the invention in communications technology, in optical modulators (eg. Mach-Zehnder interferometers), in optical switches, for frequency mixing or in waveguides is to be emphasized.

The following is specifically to be explained regarding the synthesis components of the polyadducts according to the invention and concerning their use.

Both the preparation of the polyadducts according to the invention and the chromophores on which they are based can be carried out by customary and known methods of organic chemistry, as are described, for example, in March, "Advanced Organic Chemistry", or in Organicum, 16th edition or in "Kunststoff-Handbuch" (Plastics Handbook), 2nd edition 1983, Carl-Hanser Verlag, Munich, Vienna, volume 7, "Polyurethanes".

The preparation of the monomeric azo dyestuffs containing heterocyclic components, to be employed as starting materials for the polyadducts, can be carried out, for example, by reacting appropriately substituted heterocycles bearing amino groups with nitrosylsulfuric acid in strongly acidic medium. The diazonium salt solutions thus obtained can then be reacted (if possible at temperatures of <5° C.), for example, with N,N-bis(hydroxyalkyl)aniline in strongly acidic medium (conc. sulfuric acid+sulfamic acid), isolated by addition of alkali solution and purified in a customary manner (for example by recrystallizing). The bishydroxy compounds thus obtainable can then be converted to the polyadducts according to the invention, for example by reaction with polyisocyanates, if appropriate together with components (c) or (d), in the ratio 2:1 to 1:2 and purified in the customary manner (for example by reprecipitating).

The molecular weight can be adjusted in the manner known to the person skilled in the art by the choice of the ratio of NCO groups to NCO-reactive groups.

The polyadducts according to the invention in general have average molecular weights $\overline{M}_n$ of from 500 to 500,000.

Suitable polyisocyanates (a) for the synthesis of the polyadducts according to the invention are eg. diisocyanates of the general formula $X(NCO)_2$, X being an aliphatic hydrocarbon radical having 4 to 12 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms. Examples of diisocyanates of this type are tetramethylene diisocyanate, hexamethylene diisocyanate, dodecamethylene diisocyanate, 1,4-diisocyanatocyclohexane, 1-iso-cyanato-3,5,5-trimethyl-5-isocyanatomethylcyclohexane (IPDI), 4,4'-diisocyanatodicyclohexylmethane (HMDI), 4,4'-diisocyanato-2,2-dicyclohexylpropane, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, m- and p-tetramethylxylylene diisocyanate and mixtures consisting of these compounds.

It is also possible to additionally use the more highly functionalized polyisocyanates known per se in polyurethane chemistry or alternatively modified, for example carbodiimide-, allophanate-, isocyanurate-, urethane- and/or biuret-containing polyisocyanates known per se proportionally.

Component (b) is a diol of the general formula (I)

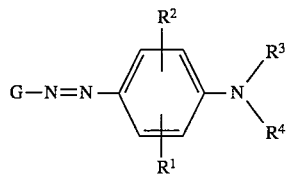

where $R^1$ and $R^2$ are identical to or different from one another and are hydrogen, alkyl having 1 to 6 carbon atoms, eg. methyl, ethyl, n-propyl, isopropyl, n-butyl, isobutyl, pentyl, hexyl, alkoxy having 1 to 6 carbon atoms, eg. methoxy, ethoxy, propoxy, butoxy, phenyl- or $C_1$-to $C_4$-alkoxy-substituted alkyl, eg. methylmethoxy, CN, $NO_2$, $SO_3H$, CHO or a crosslinkable group, such as a cinnamic acid, oxirane, acrylate, methacrylate, vinyl, vinyl ester or vinyl ether radical or CN, $NO_2$, $SO_3H$ or CHO;

$R^3$ and $R^4$ are identical to or different from one another and are aliphatic hydrocarbon radicals having 1 to 12 carbon atoms, for example methyl, ethyl, propyl, isopropyl, n-butyl, isobutyl, pentyl, hexyl, octyl, nonyl, decyl, undecyl, dodecyl, cycloaliphatic hydrocarbons having 5 to 15 carbon atoms, for example cyclopentyl, cyclohexyl, cycloheptyl, aromatic hydrocarbons having 6 to 15 carbon atoms, for example phenyl, tolyl, xylyl, or araliphatic hydrocarbons having 7 to 15 carbon atoms, for example benzyl or ethylphenyl, or $R^3$ and $R^4$ together form a nitrogen-containing ring, with the proviso that either $R^3$ and $R^4$ in each case bear a hydroxyl group or $R^3$ bears two hydroxyl groups, but $R^4$ bears no hydroxyl group, or in the case where $R^3$ and $R^4$ form a nitrogen-containing ring, this ring bears two hydroxyl groups bonded directly or via $C_1$–$C_6$-alkylene groups, such as eg. via ethylene groups;

G is a heterocyclic ring as an electron acceptor, in particular a radical of the general formula

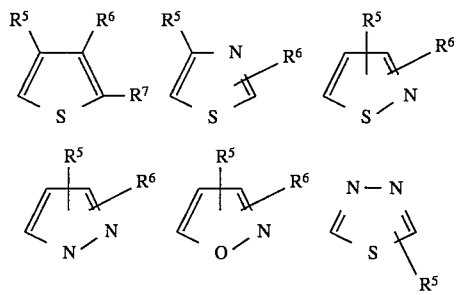

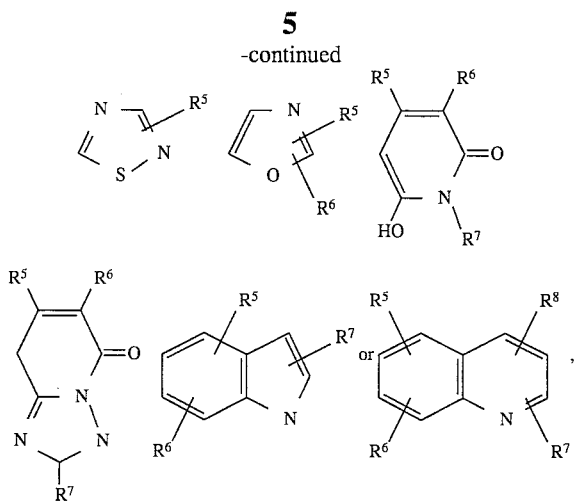

where
R⁵ to R⁸ are identical to or different from one another and are alkyl having 1 to 10 carbon atoms, for example methyl, ethyl, n-propyl, isopropyl, n-butyl, isobutyl, hexyl, heptyl, octyl, decyl, cycloalkyl having 3 to 8 carbon atoms, eg. cyclopentyl, cyclohexyl, cycloheptyl, alkoxy having 1 to 8 carbon atoms, for example methoxy, ethoxy, propoxy, butoxy, halogen, such as eg. fluorine, chlorine, bromine or iodine, CN, $NO_2$, $COOR^9$, $(CH_2)_z$—$COOR^9$ where z=1 to 10, $R^9$=alkyl having 1 to 10 carbon atoms, phenyl, benzyl, ethylphenyl or alkenyl having 2 to 10 carbon atoms, such as eg. vinyl, allyl, or in each case two of the radicals $R^5$ to $R^8$ together form fused rings such as eg. naphthyl;

Examples of preferred chromophores (b) containing heterocyclic rings are:

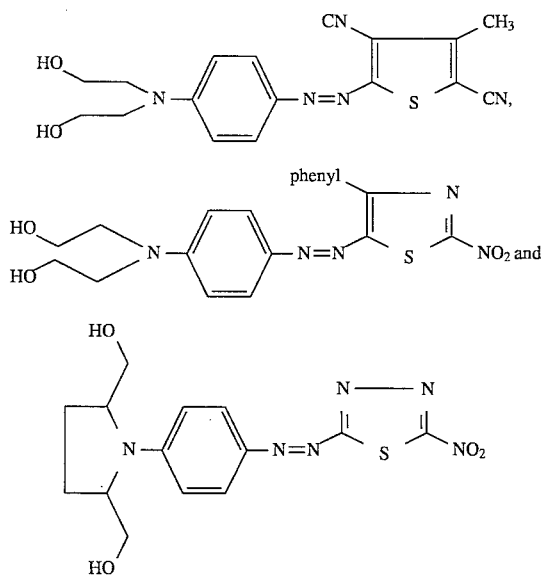

Suitable compounds (c) having at least two groups reactive to isocyanate and a molar weight of up to 500 g/mol are eg. the corresponding diols and triols, mentioned under (d), suitable for the preparation of the polyether diols, and also alcohols which have more than three functional groups, such as pentaerythritol or sorbitol, amino alcohols such as ethanolamine, isopropanolamine, methylethanolamine, diaminopropanes, diaminobutanes, diaminohexanes, piperazine, 2,5-dimethylpiperazine, 1-amino-3-amino-methyl-3,5,5-trimethylcyclohexane (isophoronediamine, IPDA), 4,4'-diaminodicyclohexylmethane, 1,4-diaminocyclohexane, hydrazine or hydrazine hydrate. Water is also suitable.

Linear α,ω-dihydroxyalkanes such as ethane-1,2-diol, butane-1,4-diol, pentane-1,5-diol, hexane-1,6-diol or ether-containing alcohols are preferably used as component (c).

From 0 to 0.9 gram equivalent of NCO-reactive groups from compounds (c) having at least two groups reactive to isocyanate are used, preferably from 0 to 0.8 gram equivalent.

Component (d) is a polyhydroxy compound of molecular weight range from 500 to 5000 g/mol, preferably from 600 to 4000 g/mol. Those suitable are in particular the polyester- and polyetherols known per se.

Suitable polyesterols are reaction products of polyhydric, preferably dihydric, and if desired additionally trihydric alcohols, with polybasic, preferably dibasic, aromatic carboxylic acids. Instead of the free carboxylic acids, the corresponding carboxylic anhydrides or corresponding carboxylic acid esters of lower alcohols or their mixtures can be used for preparing the polyesterdiols. Examples of polybasic carboxylic acids which may be mentioned are:

Succinic acid, glutaric acid, adipic acid, suberic acid, azelaic acid, sebacic acid, tetrahydrophthalic acid, hexahydrophthalic acid, endomethylenetetrahydrophthalic acid, maleic acid, fumaric acid, dimeric fatty acids, phthalic acid, isophthalic acid, terephthalic acid, the isomeric benzenetri- and -tetracarboxylic acids, tetrachlorophthalic acid, the isomeric pyridinedi-carboxylic acids and, if existent, their anhydrides.

Possible polyhydric alcohols are eg. ethanediol, propane-1,2- and -1,3-diol, butane-1,4-, -1,3- and -2,3-diol, butene-1,4-diol, butyne-1,4-diol, the isomeric pentane-, hexane- and octanediols, neopentyl glycol, 1,4-bishydroxymethylcyclohexane, 2-methyl-1,3-propanediol, hydroquinone bis(hydroxyethyl ether), alkoxylated bisphenol A, and also di-, tri-, tetra- and polyethylene glycol, di- and polypropylene glycol, dibutylene glycol and polybutylene glycols. Alcohols which have more than two functional groups, such as eg. glycerol, trimethylolpropane, trimethylolethane or hexane-1,2,6-triol can additionally be used in low amounts, ie. not exceeding 10 mol %.

Polyetherols based on epoxides of ethene, propene, butene or styrene and also polytetrahydrofuran can also be used.

From 0 to 0.5, preferably 0 to 0.2, gram equivalent of OH from polyhydroxy compounds (d) can be used, particularly preferably no polyhydroxy compounds (d) having a molecular weight of from over 500 up to 5000 g/mol are additionally used.

Further examples of compounds which can be employed for the preparation of the polyurethanes according to the invention as components (a), (b) and (d) are described eg. in High Polymers, Vol. XVI, "Polyurethanes, Chemistry and Technology", by Saunders-Frisch, Interscience Publishers, New York, London, volume I, 1962.

The ratio of the NCO groups in component (a) to the sum of the NCO-reactive groups in the components (b), (c) and (d) should be from 2:1 to 1:2, preferably from 1.5:1 to 1:1.5, in particular 1:1. Free NCO groups which may still be present in the polyadduct can be reacted, if desired, with simple alcohols, such as eg. methanol, ethanol; amine, ammonia or water.

The urethane-containing polyadducts according to the invention can be prepared by the customary methods.

Preferably, the preparation is carried out in solvents inert to isocyanate such as hydrocarbons, ketones, ethers, esters or amides, it being possible for the reaction temperature to be from 50° to 200° C., preferably from 60° to 150° C.

To accelerate the reaction, the customary catalysts, such as dibutyltin dilaurate, tin(II) octoate or diazobicyclo[2.2.2]octane, can additionally be used.

The preparation of layers which contain the polyadducts according to the invention is carried out in a manner known per se, eg. by wet coating (spin coating) with a 5–15% strength solution of the polyadduct in a solvent (eg. tetrachloroethane, methylene chloride, tetrahydrofuran).

Suitable substrates in this case are eg. indium tin oxide (=ITO) and others. In the case of a suitable substitution pattern (eg. epoxy structure), the polyadducts can also be crosslinked photochemically, thermally or by the action of electron beams.

The novel polyadducts are distinguished by good processability to give thin layers, high purity, narrow molecular weight distribution, good orientation in the electric field, good long-term stability and good electrooptical coefficients.

The parts and percentages mentioned in the examples are, if not stated otherwise, parts by weight or percentages by weight.

I. Preparation of Component (b) (azo dyestuffs containing heterocyclic components)

EXAMPLE 1

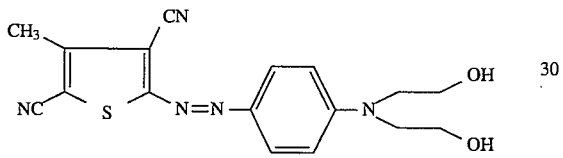

1.63 g (0.01 mol) of 2-amino-3,5-dicyano-4-methylthiophene were stirred in 50 g of glacial acetic acid/propionic acid (17:3, v/v). 7 g of 85% strength by weight sulfuric acid were then added dropwise at room temperature and 3 g of nitrosylsulfuric acid at from 0° to +5° C.

After stirring at from 0° to 5° C. for three hours, the resulting diazonium salt solution was added dropwise to 2.09 g (0.01 mol) of N,N-bis(hydroxyethyl)aniline in 150 g of ice-water and 10 g of conc. sulfuric acid and 0.5 g of sulfamic acid at <0.5° C. and a pH of from 1 to 1.5. The pH was kept at from 1 to 1.5 by addition of 20% strength by weight sodium hydroxide solution. After stirring overnight at room temperature, the precipitated dyestuff was filtered off with suction, washed with water and dried. Recrystallization was carried out from chlorobenzene.

Yield: 2.2 g $C_{17}H_{17}N_4O_2S$ (341)

Calc.: C 59.82 H 5.00 N 16.42 O 9.38 S 9.38

Found: C 60.10 H 4.95 N 16.30 O 8.99 S 9.66

The products shown in the following table can be obtained in a similar manner to Example 1.

| Ex. No. | Formula |
|---|---|
| 2 | ![structure] Cl, NC—S—C(CN)=C—N=N—C6H4—N(CH2CH2OH)2 |
| 3 | ![structure] Cl, OHC—S—C(CN)=C—N=N—C6H4—N(CH2CH2OH)2 |
| 4 | ![structure] O2N—C(=N—N=)—S—C—N=N—C6H4—N(CH2CH2OH)2 |
| 5 | ![structure] Cl, NC—S—C(CN)=C—N=N—C6H4—N(CH2CH2CH2CH2OH)2 |

-continued

| Ex. No. | Formula |
|---|---|
| 6 | 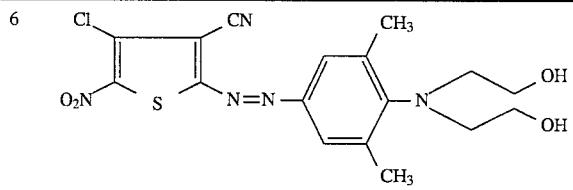 |
| 7 | 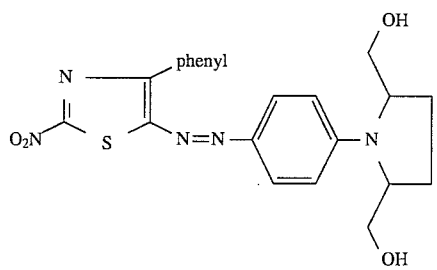 |
| 8 | 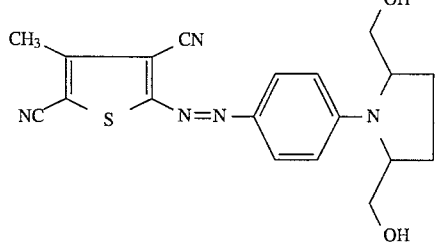 |

II. Preparation of the Polyadducts

EXAMPLE 9

2.22 g (10 mmol) of isophorone diisocyanate (IPDI), 200 g of toluene and 0.1 g of dibutyltin dilaurate were initially introduced into a one-necked flask. A Soxhlet extractor was charged with 3.55 g (10 mmol) of the dyestuff obtained as in Example 1 and the mixture was extracted until all the dyestuff had been transferred to the flask. The toluene was then stripped off in vacuo, and the residue was boiled with 50 g of methanol and worked up.
Average molecular weight: 330,000
$T_G$: 158° C.

EXAMPLE 10

4.44 g (20 mmol) of isophorone diisocyanate (IPDI), 200 g of toluene and 0.1 g of dibutyltin dilaurate were initially introduced into a one-necked flask. A Soxhlet extractor was charged with 3.55 g (10 mmol) of the dyestuff obtained as in Example 1 and 1.04 g (10 mmol) of pentane-1,5-diol and the mixture was extracted until all the dyestuff had been transferred to the flask. The toluene was then stripped off in vacuo, and the residue was boiled with 50 g of methanol and worked up.
Average molecular weight: 95,000
$T_G$: 128° C.

EXAMPLE 11

6.66 g (30 mmol) of isophorone diisocyanate (IPDI), 200 g of toluene and 0.1 g of dibutyltin dilaurate were initially introduced into a one-necked flask. A Soxhlet extractor was charged with 3.55 g (10 mmol) of the dyestuff obtained as in Example 1 and 2.08 g (20 mmol) of pentane-1,5-diol and the mixture was extracted until all the dyestuff had been transferred to the flask. The toluene was then stripped off in vacuo, and the residue was boiled with 50 g of methanol and worked up.
Average molecular weight: 440,000
$T_G$: 98° C.

For working up, the polyadducts were in each case repeatedly precipitated from THF/methanol and then dried in a high vacuum.

III. Layer Formation and Polarization in the Electric Field; Determination of the Electrooptical Coefficients

EXAMPLE 12

2 g of the polyadduct from Example 9 were dissolved in 30 g of N-methylpyrrolidone and processed by spin coating to give a layer having a thickness of 50 μm. The sample was then placed between two transparent electrodes. The electrodes consisted of glass, coated with an electrically conductive and transparent indium tin oxide layer (ITO layer). At 100° C., an electric field of 100 V/mm was applied to the sample and maintained for 15 minutes. The sample was subsequently allowed to cool to room temperature and the electrical polarizing field was then removed.

The electrooptical coefficient of the polarized polyurethane sample was then determined at a laser wavelength of 1306 nm with r=3 pm/V.

(Formulae for the determination of the electrooptical coefficiencies can be taken from the literature—eg. D. A. Williams, Angew. Chem. 96 (1984) 637.)

We claim:

1. An azo dyestuff- and urethane-containing polyadduct comprising (a) at least one organic polyisocyanate, (b) at least one diol of a heterocyclic azo dyestuff, and if desired (c) one or more compounds having at least two groups reactive to NCO, which have an average molecular weight of $\overline{M}_n$ of up to 500 g/mol, and/or (d) one or more polyhydroxy compounds having average molecular weights $\overline{M}_n$ of from over 500 up to 5000 g/mol, with the proviso that relative to one gram equivalent of NCO of the component (a), from 0.1 to 2 gram equivalents of hydroxyl groups of the components (b), from 0 to 0.9 gram equivalents of NCO-reactive groups of the component (c), and from 0 to 0.5 gram equivalent of hydroxyl groups of the component (d) are employed, the ratio of the NCO groups in component (a) to the sum of the NCO-reactive groups in the components (b), (c) and (d) being 2:1 to 1:2, and the component (b) has the general formula (I)

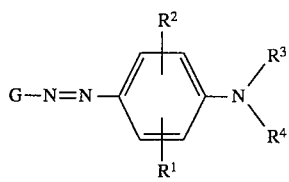
(I)

where
G is a heterocyclic ring,
$R^1$ and $R^2$ are identical to or different from one another and are hydrogen, alkyl having 1 to 6 carbon atoms, cycloalkyl having 3 to 7 carbon atoms, alkoxy having 1 to 6 carbon atoms, phenyl- or $C_1$- to $C_4$-alkoxy-substituted alkyl, CN, $NO_2$, $SO_3H$, CHO or a group capable of crosslinking, at least one of $R^1$ and $R^2$ being a group capable of crosslinking selected from the group consisting of cinnamic acid, oxirane, acrylate, methacrylate, vinyl, vinyl ester or vinyl ether radical;
$R^3$ and $R^4$ are identical to or different from one another and are aliphatic hydrocarbon radicals having 1 to 12 carbon atoms, cycloaliphatic hydrocarbon radicals having 5 to 15 carbon atoms, aromatic hydrocarbon radicals having 6 to 15 carbon atoms or araliphatic hydrocarbon radicals having 7 to 15 carbon atoms, or $R^3$ and $R^4$ together form a nitrogen-containing ring, with the proviso that either $R^3$ and $R^4$ in each case carry a hydroxyl group or $R^3$ carries two hydroxyl groups, but $R^4$ carries no hydroxyl group, or in the case where $R^3$ and $R^4$ together form a nitrogen-containing ring, this ring carries two hydroxyl groups bonded directly or via $C_1$-$C_6$-alkylene groups.

2. A polyadduct as claimed in claim 1, wherein G is a radical of the general formula

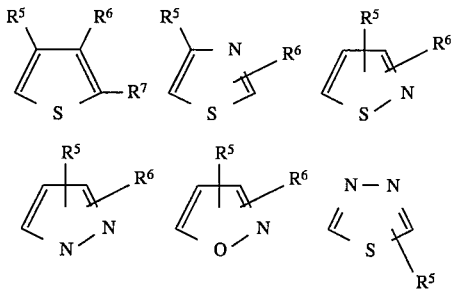

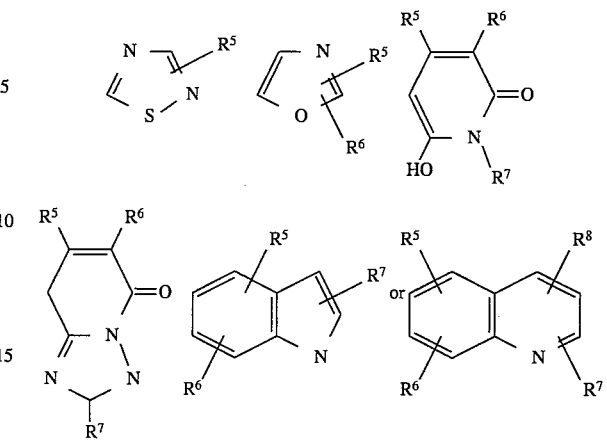

where
$R^5$ to $R^8$ are identical to or different from one another and are
    alkyl having 1 to 10 carbon atoms,
    cycloalkyl having 3 to 8 carbon atoms,
    alkoxy having 1 to 8 carbon atoms,
    halogen, CN, $NO_2$, $CONH_2$, $CONH_2$, $CONR_2^9$, $COOR^9$, $(CH_2)_z$—$COOR^9$
    where z=1 to 10, NH—CO—$R^9$,
$R^9$=alkyl having 1 to 10 carbon atoms, phenyl, benzyl, ethylphenyl or alkenyl having 2 to 10 carbon atoms or two of the radicals $R^5$ to $R^8$ in each case together form fused rings, or $R^5$ to $R^9$ are crosslinkable groups.

3. The polyadduct of claim 1, wherein, in the general formula (I), $R^3$ and $R^4$ are —$CH_2$—$CH_2$—OH.

4. The polyadduct of claim 1, wherein the crosslinkable group is a cinnamoyl, oxirane,

$CH_2$=CH—, $CH_2$=CH—O—CO— or $CH_2$=CH—O— radical.

5. A nonlinear optic layer material comprising an azo dyestuff- and urethane-containing polyadduct comprising (a) at least one organic polyisocyanate, (b) at least one diol of a heterocyclic azo dyestuff, and if desired (c) one or more compounds having at least two groups relative to NCO, which have an average molecular weight of $\overline{M}_n$ of up to 500 g/mol, and/or (d) one or more polyhydroxy compounds having average molecular weights $\overline{M}_n$ of from over 500 up to 5000 g/mol, with the proviso that relative to one gram equivalent of NCO of the component (a), from 0.1 to 2 gram equivalents of hydroxyl groups of the components (b), from 0 to 0.9 gram equivalents of NCO-reactive groups of the component (c), and from 0 to 0.5 gram equivalent of hydroxyl groups of the component (d) are employed, the ratio of the NCO groups in component (a) to the sum of the NCO-reactive groups in the components (b), (c) and (d) being 2:1 to 1:2, and the component (b) has the general formula (I)

$$G-N=N-\underset{R^1}{\overset{R^2}{\underset{\|}{\bigcirc}}}-N\underset{R^4}{\overset{R^3}{\diagdown}} \quad (I)$$

where

G is a heterocyclic ring, $R^1$ and $R^2$ are identical to or different from one another and are hydrogen, alkyl having 1 to 6 carbon atoms, cycloalkyl having 3 to 7 carbon atoms, alkoxy having 1 to 6 carbon atoms, phenyl- or $C_1$- to $C_4$-alkoxy-substituted alkyl, CN, $NO_2$, $SO_3H$, CHO or a group capable of crosslinking, at least one of $R^1$ and $R^2$ being a group capable of crosslinking selected from the group consisting of cinnamic acid, oxirane, acrylate, methacrylate, vinyl, vinyl ester or vinyl ether radical;

$R^3$ and $R^4$ are identical to or different from one another and are aliphatic hydrocarbon radicals having 1 to 12 carbon atoms, cycloaliphatic hydrocarbon radicals having 5 to 15 carbon atoms, aromatic hydrocarbon radicals having 6 to 15 carbon atoms or araliphatic hydrocarbon radicals having 7 to 15 carbon atoms, or $R^3$ and $R^4$ together form a nitrogen-containing ring, with the proviso that either $R^3$ and $R^4$ in each case carry a hydroxyl group or $R^3$ carries two hydroxyl groups, but $R^4$ carries no hydroxyl group, or in the case where $R^3$ and $R^4$ together form a nitrogen-containing ring, this ring carries two hydroxyl groups bonded directly or via $C_1$–$C_6$-alkylene groups, said layer having been subjected to an electric polarizing field.

6. A nonlinear optical layer material as claimed in claim 5, wherein G is a radical of the general formula

[structural formulas of heterocyclic rings with substituents $R^5$, $R^6$, $R^7$, $R^8$]

where $R^5$ to $R^8$ are identical to or different from one another and are alkyl having 1 to 10 carbon atoms, cycloalkyl having 3 to 8 carbon atoms, alkoxy having 1 to 8 carbon atoms, halogen, CN, $NO_2$, $CONH_2$, $CONR_2^9$, $COOR^9$, $(CH_2)_z$—$COOR^9$ where z=1 to 10, NH—CO—$R^9$, $R^9$ is alkyl having 1 to 10 carbon atoms, phenyl, benzyl, ethylphenyl or alkenyl having 2 to 10 carbon atoms or two of the radicals $R^5$ to $R^8$ in each case together form fused rings, or $R^5$ to $R^9$ are crosslinkable groups.

7. The nonlinear optic layer material of claim 5, wherein, in the general formula (I), $R^3$ and $R^4$ are —$CH_2$—$CH_2$—OH.

8. The nonlinear optic layer material of claim 5, wherein the crosslinkable group is a cinnamoyl, oxirane, $$CH_2=CH-\overset{\overset{O}{\|}}{C}O-, \quad CH_2=C(CH_3)-\overset{\overset{O}{\|}}{C}O-$$

$CH_2=CH-$, $CH_2=CH-O-CO-$ or $CH_2=CH-O-$ radical.

9. A device for communication comprising the nonlinear optic layer material of claim 5.

10. The device of claim 9, as an optical modulator.

11. The device of claim 9, as an optical switch.

12. A crosslinked nonlinear optic layer material comprising an azo dyestuff- and urethane-containing polyadduct comprising (a) at least one organic polyisocyanate, (b) at least one diol of a heterocyclic azo dyestuff, and if desired (c) one or more compounds having at least two groups relative to NCO, which have an average molecular weight of $\overline{M}_n$ of up to 500 g/mol, and/or (d) one or more polyhydroxy compounds having average molecular weights $\overline{M}_n$ of from over 500 up to 5000 g/mol, with the proviso that relative to one gram equivalent of NCO of the component (a), from 0.1 to 2 gram equivalents of hydroxyl groups of the components (b), from 0 to 0.9 gram equivalents of NCO-reactive groups of the component (c), and from 0 to 0.5 gram equivalent of hydroxyl groups of the component (d) are employed, the ratio of the NCO groups in component (a) to the sum of the NCO-reactive groups in the components (b), (c) and (d) being 2:1 to 1:2, and the component (b) has the general formula (I)

$$G-N=N-\underset{R^1}{\overset{R^2}{\underset{\|}{\bigcirc}}}-N\underset{R^4}{\overset{R^3}{\diagdown}} \quad (I)$$

where

G is a heterocyclic ring, $R^1$ and $R^2$ are identical to or different from one another and are hydrogen, alkyl having 1 to 6 carbon atoms, cycloalkyl having 3 to 7 carbon atoms, alkoxy having 1 to 6 carbon atoms, phenyl- or $C_1$- to $C_4$-alkoxy-substituted alkyl, CN, $NO_2$, $SO_3H$, CHO or a group capable of crosslinking, $R^3$ and $R^4$ are identical to or different from one another and are aliphatic hydrocarbon radicals having 1 to 12 carbon atoms, cycloaliphatic hydrocarbon radicals having 5 to 15 carbon atoms, aromatic hydrocarbon radicals having 6 to 15 carbon atoms or araliphatic hydrocarbon radicals having 7 to 15 carbon atoms, or $R^3$ and $R^4$ together form a nitrogen-containing ring, with the proviso that either $R^3$ and $R^4$ in each case carry a hydroxyl group or $R^3$ carries two hydroxyl groups, but $R^4$ carries no hydroxyl group, or in the case where $R^3$ and $R^4$ together form a nitrogen-containing ring, this ring carries two hydroxyl groups bonded directly or via $C_1$–$C_6$-alkylene groups, said layer having been subjected to an electric polarizing field.

* * * * *